(12) United States Patent
Hamatake

(10) Patent No.: US 8,527,493 B1
(45) Date of Patent: Sep. 3, 2013

(54) DISTRIBUTING CONTENT

(75) Inventor: Nicolas Hamatake, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 329 days.

(21) Appl. No.: 12/724,662

(22) Filed: Mar. 16, 2010

(51) Int. Cl.
*G06F 7/00* (2006.01)
*G06F 17/30* (2006.01)

(52) U.S. Cl.
USPC ............................ 707/707; 707/722; 707/728

(58) Field of Classification Search
USPC ................ 707/705, 709, 707, 722, 726, 728; 709/203, 217
See application file for complete search history.

(56) References Cited

U.S. PATENT DOCUMENTS

| | | | |
|---|---|---|---|
| 6,647,381 B1 * | 11/2003 | Li et al. | 707/999.003 |
| 6,760,746 B1 * | 7/2004 | Schneider | 709/203 |
| 7,647,316 B2 | 1/2010 | Patel et al. | |
| 8,069,182 B2 * | 11/2011 | Pieper | 707/769 |
| 8,195,638 B1 * | 6/2012 | Barnes et al. | 707/709 |
| 2005/0105513 A1 * | 5/2005 | Sullivan et al. | 370/352 |
| 2009/0222428 A1 * | 9/2009 | Bode | 707/4 |

* cited by examiner

*Primary Examiner* — Vincent F Boccio
(74) *Attorney, Agent, or Firm* — Fish & Richardson P.C.

(57) ABSTRACT

Systems and processes are provided for selecting content items for distribution to content distribution slots. A content distributor can identify relevant content for distribution in response to a request for content associated with a first domain by identifying a target domain to associate with the first domain.

22 Claims, 4 Drawing Sheets

DISTRIBUTING CONTENT

TECHNICAL FIELD

This disclosure relates to distributing content.

BACKGROUND

In many different environments, content providers want to distribute content to selected recipients. For example, advertisers want to distribute their advertisements to advertisement slots where the advertisements will be effective in communicating information to potential customers, and when the advertisements will lead to desired activity, such as a purchase of the advertiser's goods or services. In some instances, a content provider may rely on contextual information when making decisions regarding content distribution slot selections. For example, an advertiser may want to advertise goods and/or services relating to travel in travel magazines, on travel web sites, or during travel television programs. In some instances, a content provider may rely on targeting information, such as demographic information of potential viewers, when making content distribution selections.

SUMMARY

In some instances, a recipient of content provided by a content provider may not be associated with contextual information, or may be associated with a limited amount of contextual information. For example, an advertising content provider may provide advertisements in response to a request for content associated with a first web site that does not include any content. In such instances, the advertising content provider may use the domain name or URL of the first web site in order to identify targeting information to be used when selecting advertising content for distribution to the first web site. In this example, the advertising content provider may perform a search using a portion or all of the domain name or URL as a search term, and may identify a domain returned as a search result as a target domain that the advertising content provider then associates with the domain name of the first web site. The advertising content provider may then rely on contextual information associated with the target domain when selecting advertising content to provide to the first web site. The advertising content provider also may provide a web page that includes identified advertising content in response to a request for content from the first web site.

Implementations can provide any, all or none of the following advantages. For example, advertisements can be targeted to domains that are not associated with content. For example, a parked domain that has been registered by a domain owner can receive targeted advertising content in response to a user making an HTTP request for content associated with the parked domain. Advertisements can be targeted to web sites that include little or no textual information on which to base targeting information. For example, advertisements can be targeted for a web site that includes streaming media but no text information to be used for the purposes of advertisement targeting.

In one general aspect, managing content distribution includes receiving an indication of a first domain name that is not associated with content, and determining one or more search terms based on the first domain name, with at least one of the one or more search terms including at least a portion of the first domain name. A search is performed using the one or more search terms, a second domain name is identified as a target domain name using results of the search, and the first domain name is associated with the target domain name. When a request for content corresponding to the first domain name is received, content associated with the target domain name is selected and provided in response to the request for content.

Implementations may include one or more of the following features. For example, after the search is performed, a determination can be made as to whether a spelling suggestion is returned as a result of the search, and, if so, a second search can be performed using the spelling suggestion as a search term.

Before the first domain name is associated with the target domain name, a determination can be made as to whether the second domain name includes the first domain name. If the second domain name includes the first domain name, the results of the search can be used to identify a third domain name as the target domain name.

Before the first domain name is associated with the target domain name, a determination can be made as to whether a quantity of contextual information associated with the second domain name meets or exceeds a predetermined threshold. If the quantity of contextual information associated with the second domain name does not meet or exceed the predetermined threshold, the results of the search can be used to identify a third domain name as the target domain name.

A portion of the first domain name can be used to identify a language or a country associated with the first domain name, and performing the search can include performing a language or country specific search based on the identified language or country. Performing the search can include searching archived search data.

Selecting content associated with the target domain name can include parsing contextual information associated with the target domain name to identify one or more topics of the contextual information. Selecting content associated with the target domain name also can include selecting one or more content items at least partially based on relevance to the one or more identified topics. The selected content can include advertising content.

In another general aspect, providing targeted content includes identifying a first URL and performing a keyword search using at least a portion of the first URL as a keyword. A second URL associated with a search result of the keyword search is identified, content associated with the second URL is parsed to identify subject matter associated with the content, and one or more content items are selected at least partially based on relevance to the identified subject matter. When a request for content associated with the first URL is received, one or more content items are provided in response to the request.

Implementations may include one or more of the following features. For example, the one or more content items can include one or more advertising content items.

After the search is performed, a determination can be made as to whether a spelling suggestion is returned as a result of the search, and, if so, a second search can be performed using the spelling suggestion as a search term.

If a particular URL associated with a search result includes the first URL, the particular URL can be not identified as the second URL. If a quantity of content associated with a particular URL does not meet or exceed a predetermined threshold, the particular URL can be not identified as the second URL.

A portion of the first URL can be used to identify a language or country associated with the first URL, and performing the keyword search can include performing a language or country specific search based on the identified language or country. Performing the keyword search can include searching archived search data.

Providing the one or more content items in response to the request can include providing a web page that includes the one or more content items. The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Many publishers include content provided by third party content providers in publications under the publisher's control. For example, newspaper publishers include advertisements, called creatives, provided by advertisers, and syndicated columns provided by independent columnists. Third party content may be matched to a publication based on contextual information associated with a publication.

A web site may include advertisement slots in one or more web pages of the web site. The advertisement slots are purchased by advertisers, and an advertisement server system provides the advertisements to the publisher on behalf of the advertisers. The advertisements are displayed alongside content of the web site. In some cases, the web site contains little or no standalone content and the advertisements are provided to populate the web site.

Figure 1:
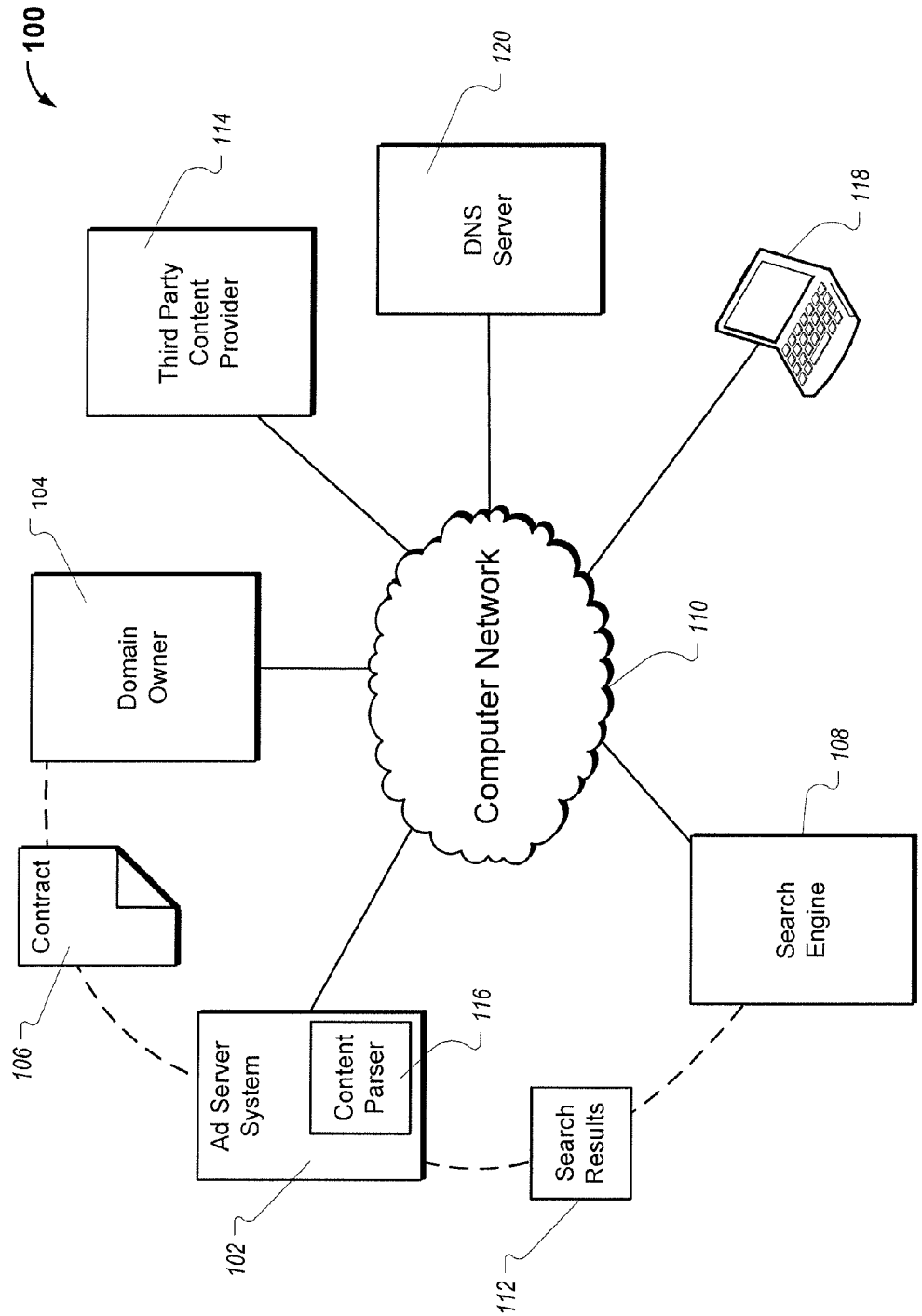
FIG. 1 is a block diagram of a system for managing distribution of advertising content.

Referring to FIG. 1, in an example system 100 in which the content items are advertisements, a domain owner 104 is associated with a registered domain name. For example, the domain owner 104 registers the domain "exampledomainname.org" and therefore is the legal owner of the domain "exampledomainname.org." In the example depicted, an agreement 106 exists between the domain owner 104 and an advertisement server system 102 that the advertisement server system 102 will provide advertising content for the domain owner 104. The domain owner may register the registered domain name using a third party domain registrar.

The advertising content provided by the advertisement server system 102 may be displayed alongside content of a web page associated with the registered domain. In such instances, the provided advertisements may be selected so as to be relevant to content displayed by the web page. For example, if the registered domain is associated with a web page that contains an article about hunting, the advertisement server system 102 may supply advertisements for hunting gear, hunting related media, or hunting related items.

In some cases, the registered domain is associated with little or no content. For example, the registered domain may be a "parked domain" that is not associated with any web content. In these cases, when a request for content associated with the registered domain is made, the request can be routed to the advertisement server system 102. In response to the request, the advertisement server system 102 provides a web page that includes advertising content and little or no other content. For example, the web page provided by the advertisement server system 102 can include a header and several advertisement slots but no other content, and advertisements may be supplied by the advertisement server system 102 to fill the advertisement slots. In other implementations, the advertisement server system 102 may provide advertising content to a third party domain registrar through which the domain owner 104 has registered the registered domain. The third party domain registrar then provides a web page that includes the advertising content provided by the advertisement server system 102.

As another example, the registered domain may be associated with a web page that contains only streaming media content, and no textual content that can be used to determine subject matter of the web page. In this example, web page may include advertisement slots in addition to the streaming media content, and the advertisement server system 102 may supply advertisements for the advertisement slots.

In cases in which the registered domain is associated with little or no contextual information to be used for the purpose of selecting relevant advertisements, the advertisement server system 102 identifies contextual information to be used to identify subject matter relevant to the registered domain name. Advertisements that relate to the identified relevant subject matter then can be selected as being relevant to the registered domain name.

Still referring to FIG. 1, the advertisement server system 102 identifies contextual information that is relevant to the registered domain by performing a search using a portion or all of the registered domain as a search term. For example, if the registered domain is "foo.org," the advertisement server system 102 performs a search using "foo.org" as a search term. In some implementations, the advertisement server system 102 strips the top level domain (TLD) from the registered domain before performing a search. Following the above example, the advertisement server system 102 strips the TLD ".org" from the domain name "foo.org" which leaves the string "foo" which the advertisement server system 102 then uses as a search term. In other implementations, the advertisement server system 102 identifies individual words within the registered domain and uses the identified words as search terms. For example, if the registered domain is "kickballamerica.com" the advertisement server system 102 can identify the words "kick," "ball," "America," and "lame" in the registered domain and use the words as search terms.

In the illustrated implementation, the advertisement server system 102 performs a search for the identified search terms by using a search engine 108. The advertisement server system 102 communicates with the search engine 108 through a computer network 110 (e.g., the Internet, a LAN or a WAN). In other implementations, the advertisement server system 102 is co-located with the search engine 108 to facilitate direct communication between the advertisement server system 102 and the search engine 108.

In the example shown in FIG. 1, the advertisement server system 102 provides one or more search terms derived from the registered domain name to the search engine 108 via the computer network 110. The search engine 108 performs a search for the provided search terms and returns search results 112 to the advertisement server system 102 through the computer network 110. The advertisement server system 102 uses the search results 112 to identify one or more web sites that include content that can be used to identify relevant subject matter for the registered domain.

The registered domain also can be used to determine a language to associate with the first domain. For example, if the registered domain is "example.es" the top level domain of the registered domain can be identified as a top level domain for the country of Spain. In this example, Spanish can be identified as a language to associate with the first domain since Spain is a predominantly Spanish-speaking country. In such implementations, the identified language can be used to perform a language specific search. For example, the advertisement server system 102 can indicate to the search engine 108 that only results for Spanish-language web sites should be included in the search results 112. In some implementations, the identified language can be used to identify a language specific search engine. The language specific search engine is then used to perform the search using the identified search terms.

The registered domain can be used to determine a country to associate with the first domain. For example, if the registered domain is "foo.fr," the top level domain of the registered domain can be identified as a top level domain for the country of France. In this example, France can be identified as a country to associate with the first domain. In such implementations, the identified country can be used to perform a country specific search. For example, the advertisement server system 102 can indicate to the search engine 108 that only French web sites or web sites associated with domains that have ".fr" as a top level domain should be included in the search results 112. In some implementations, the identified country can be used to identify a country specific search engine. The country specific search engine is then used to perform the search using the identified search terms.

In some cases, the search results 112 may include a suggested corrected spelling for one or more of the search terms provided by the advertisement server system 102. In these cases, the advertisement server system 102 may indicate to the search engine 108 that a new search is to be performed using the suggested corrected spelling(s) for the one or more search terms. For example, if the registered domain is "raodwarrior.com" and the advertisement server system 102 provides a search term of "raodwarrior" to the search engine 108, the search results 112 returned by the search engine 108 may suggest a corrected spelling of "roadwarrior," and the advertisement server system 102 then may indicate to the search engine 108 that a new search is to be performed using "roadwarrior" as a search term. The search engine 108 then provides a new set of search results 112 to the advertisement server system 102 based on the suggested corrected spelling. As an alternative, the advertisement server system 102 may use the original search results 112 provided by the search engine 108 and not request a subsequent search from the search engine 108 using the suggested corrected spelling(s) for the one or more search terms.

The advertisement server system 102 identifies domains associated with one or more of the search results as target domains. For example, the advertisement server system 102 may identify the top search result as a target domain. As another example, the advertisement server system 102 may identify the top three search results as target domains.

The advertisement server system 102 may disregard search results for which the domain of the search result includes the registered domain. This can help the advertisement server system 102 to avoid using web sites that contain information about the ownership of the registered domain (such as a "whois" look up site) as a basis for identifying contextual information to be used when selecting relevant advertising content. For example, if the registered domain is "exampledomain.net," the number one search result may be associated with the domain "www.whois.com/query?domain=exampledomain.net." In this example, the advertisement server system 102 disregards the first search result and identifies a subsequent search result as a target domain.

The advertisement server system 102 associates identified target domains with the registered domain. For example, relationships between various registered domains and target domains can be stored in a database, file, or lookup table.

The advertisement server system 102 may disregard search results for which the domain of the search result is associated with little or no contextual information on which to base selection of advertisements. For example, when a top search result is associated with a web page that contains streaming media, but contains little or no text, the advertisement server system 102 can disregard the top search result since the web page associated with the top search result does not contain enough text for the advertisement server system 102 to use as a proper basis for selecting relevant advertisements.

Upon identifying a target domain to associate with the registered domain, the advertisement server system 102 identifies or retrieves content associated with the target domain. For example, the advertisement server system 102 may send a request for content to a third party content provider 114 associated with the target domain through the computer network 110. The third party content provider 114 provides content to the advertisement server system 102 (e.g., in the form of one or more web pages). The advertisement server system 102 can use an associated content parser 116 to parse the received content in order to identify subject matter of the received content. The identified subject matter can be used to identify advertisements that are relevant to the registered domain. For example, if the third party content provider 114 is a fashion web site, the content parser 116 can parse contextual information provided by the third party content provider 114 to identify the web site as relating to high end women's fashion. The advertisement server system 102 can then select advertisements dealing with women's clothing and designer clothing labels as being particularly relevant to the registered domain, based on the contextual information provided by the third party content provider 114.

In some implementations, rather than receiving contextual information associated with the target domain from the third party content provider 114, the advertisement server system 102 can access a store of cached data that includes contextual information associated with the target domain. For example, advertisement server system 102 may be associated with a system that performs web crawls and stores cached web pages in a database. The advertisement server system 102 can access the database to identify contextual information associated with the target domain.

In some implementations, a user of the end user system 118 types the registered domain into a web browser, which causes the end user system 118 to send a request for content associated with the registered domain. For example, the end user system 118 may send a request for content associated with the domain "millsbarry.com." The request reaches a DNS server 120 that resolves the registered domain to an IP address. The end user system 118 then uses the identified IP address to send the request to a web server associated with the domain owner 104, which sends a request for content to the advertisement server system 102. In some alternative implementations, the request is routed directly to the advertisement server system 102 using the identified IP address. The advertisement server system 102 may also provide domain registrar services to the domain owner 104. Routing from a web server associated with the domain owner 104 to the ad server system 102 can be internal routing within the ad system 102.

Upon receiving the request, the advertisement server system 102 can identify the registered domain. In some implementations, the advertisement server system 102 accesses a database or lookup table to identify one or more target domains associated with the identified registered domain. For example, the domain "millsbarry.com" can be associated with a target domain of "millsberry.com." In other implementations, upon receiving the request, the advertisement server system 102 performs a search by contacting the search engine 108 and providing one or more search terms derived from the registered domain. In such implementations, the search engine 108 provides the search results 112 to the advertisement server system 102 and the advertisement server system 102 identifies one or more target domains as described above.

Upon identifying a target domain, the advertisement server system 102 retrieves contextual information associated with the target domain, for example by sending a request for content to the third party content provider 114 or by accessing a database of cached contextual data. The content parser 116 of the advertisement server system 102 parses the retrieved contextual information to identify subject matter of the contextual information. The advertisement server system 102 then selects advertisements that are relevant to the identified subject matter.

Following the above example, if the target domain is "millsberry.com," the advertisement server system 102 sends a request to the third party content provider 114 for content associated with the domain "millsberry.com." The third party content provider 114 returns the requested content to the advertisement server system 102. The content parser 116 then parses the received content to identify the content as relating to children's games and children's breakfast cereals. The advertisement server system 102 then selects advertisements for breakfast cereals, children's games, or advertisements that are directed towards children to be provided in response to the request received from the end user system 118. The selected advertisements are determined to be relevant to the user of the end user system 118 since the target domain had been returned as a search result using keywords derived from the registered domain.

In some implementations, the advertisement server system 102 creates a web page that includes one or more advertisement slots. The advertisement server system 102 populates the one or more advertisement slots with the selected advertisements and provides the web page to the end user system 118 to be displayed to the user. Following the example above, the advertisement server system 102 provides a web page to the end user system 118 that includes advertisements for breakfast cereals and child friendly games, and advertisements directed toward children (e.g., advertisements for toys or video games). The selected advertisements are targeted towards the user of the end user system 118 based on contextual information associated with domains found by using one or more search terms derived from the registered domain entered by the user. In some alternative implementations, the advertisement server system 102 provides the selected advertisements to a third party domain registrar associated with the registered domain. The third party domain registrar creates a web page using the selected advertisements and provides the web page to the end user system 118.

Figure 2:
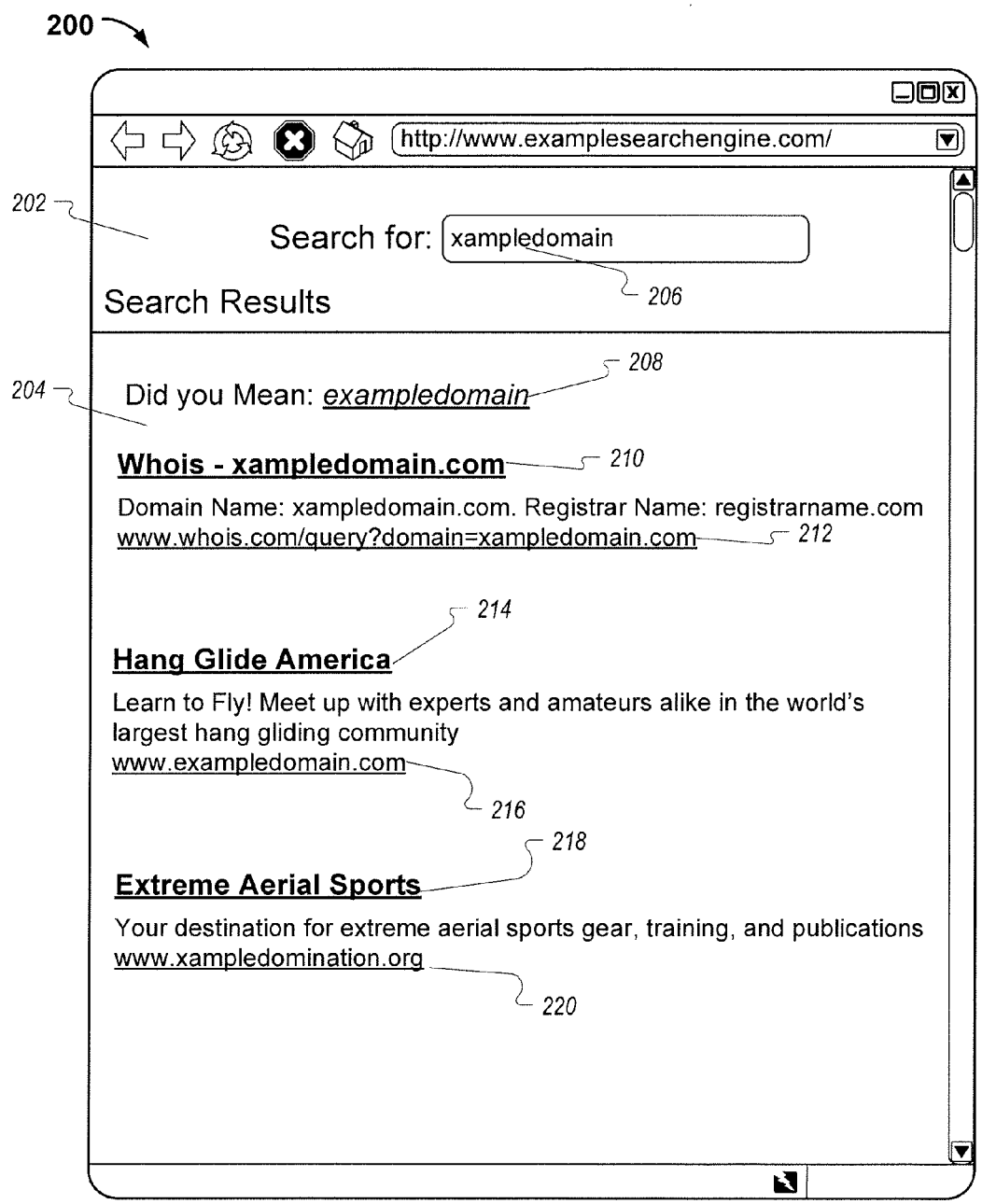
FIG. 2 is a diagram of an example search results page displayed in a web browser.

Referring now to FIG. 2, a web browser window 200 displays a search results page 202 that includes search results 204. In some implementations, the search results 204 are used by an advertisement server to identify one or more target domains to associate with a registered domain. It is important to note that search results need not be displayed in order to be used by an advertisement server, such as the advertisement server system 102 of FIG. 1. In fact, in most implementations of the example system 100 of FIG. 1, the search results 112 are not displayed.

As shown in FIG. 2, the search results page 202 includes search results 204 for a search term 206 of "xampledomain." The search term may have been derived, for example, from a registered domain name of "xampledomain.com."

In the example shown, the search results 204 include a suggested corrected spelling 208 of "exampledomain" for the search term 206. As discussed above, an advertisement server can use the suggested corrected spelling 208 as a search term in a new search, and can use search results obtained by using the suggested corrected spelling 208 as a search term to identify one or more target domains to associate with the registered domain. In other implementations, the advertisement server can ignore the suggested corrected spelling 208 and use the search results 204 to identify one or more target domains to associate with the registered domain. In some implementations, the advertisement server uses search results obtained using the suggested corrected spelling 208 as a search term in combination with the search results 204 to identify one or more target domains to associated with the registered domain.

One or more of the domains listed in the search results 204 may include the registered domain name. For example, the search results 204 may include a search result 210 for a domain 212 of "www.whois.com/query?domain=xampledomain.com." In such instances, a web page associated with the domain 212 may include information associated with ownership and registration information of the registered domain. This ownership and registration information may not be useful for determining subject matter on which to base advertisement selection. To address this, the advertisement server may ignore the search result 210 and not associate the domain 212 as a target domain for the registered domain since the domain 212 includes the registered domain.

In the example shown in FIG. 2, the search results 204 include a search result 214 for a web site that includes information about hang gliding. The advertisement server can identify a domain 216 of the search result 214 as a target domain for the registered domain. In some implementations, the advertisement server associates the registered domain with the domain 216 by storing the domain 216 in a file, database, or lookup table as a target domain for the registered domain. The advertisement server can use contextual information of the web site associated with the domain 216 to determine that the web site relates to hang gliding. The advertisement server can then use this information to select advertisements that relate to hang gliding or extreme sports as being relevant to the registered domain.

In some implementations, a domain 220 of a search result 218 is identified as a target domain of the registered domain. In the example shown, the search result 218 is for a web site that includes information about extreme aerial sports. The advertisement server can use contextual information obtained from the web site to select advertisements that relate to hang gliding and other aerial sports.

In some implementations, only the domain 216 is identified as a target domain since the search result 214 is listed above the search result 218, and is therefore assumed to be more relevant to the search term 206. In other implementations, both domains 216 and 220 are identified as target domains for the registered domain. In such implementations, contextual information associated with both domains 216 and 220 can be used to select relevant advertisements.

In other implementations, the domain 220 is identified as the only target domain for the registered domain. For example, the domain 220 may be associated with more contextual information than the domain 216. In this example, the advertisement server can identify the domain 220 as the target domain rather than the domain 216 in order to have more contextual information on which to base selection of relevant advertisements.

As another example, the advertisement sever may determine an amount of text that is associated with the domain 216. If the amount of text associated with the domain 216 is below a predetermined threshold, the advertisement server can disregard the domain 216 and identify the domain 220 as the target domain. In this example, the predetermined threshold can be 200 characters. If the domain 216 contains less than 200 characters of text, the target domain 216 is disregarded and the domain 220 is identified as a target domain to associate with the registered domain.

As yet another example, the advertisement server may disregard domain 216 if it is a link to a streaming media file rather than text information.

Figure 3:
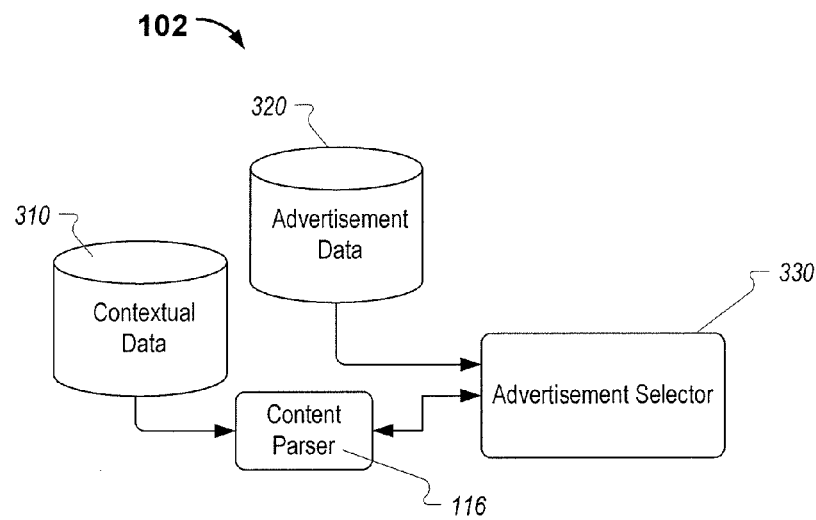
FIG. 3 is a block diagram of a system for selecting advertisements.

Referring to FIG. 3, an implementation of the ad server system 102 of FIG. 1 may be used to match third party content items in the form of advertisements to a registered domain. For example, referring to FIG. 1, the advertisement server system 102 may provide a web page in response for a HTTP request associated with the registered domain. The web page provided by the advertisement server system 102 includes one or more advertisement slots that are populated with advertisements. The advertisement server system 102 sells the advertisement slots on behalf of a domain owner. The advertisement slots are purchased by advertisers for distribution of selected advertisements. For example, when an individual makes a request for a web page associated with the registered domain, the advertisement server system 102 provides a web page that includes an advertisement creative provided by the third party content provider 114.

In the implementation shown in FIG. 3, the advertisement server system 102 includes a database 310 of contextual data to be used in identifying advertisements that are relevant to one or more registered domains for which advertisements are being supplied. For example, when the advertisement server system 102 receives contextual information associated with a target domain (e.g., a web page), the advertisement server system 102 stores contextual data received from one or more target domains in the database 310.

The content parser 116 of the advertisement selector system 102 parses the contextual data to identify relevant subject matter of the contextual data. For example, the registered domain may be associated with several target domains. Contextual data associated with the target domains is parsed by the content parser 116 in order to determine that web sites associated with the target domains relate to wine making and wine tasting. The content parser 116 then provides this information to an advertisement selector 330 of the advertisement server system. The advertisement selector can use the information received from the content parser 116 to identify advertisements that are relevant to the registered domain.

Additionally, the advertisement server system 102 can retrieve information about advertisements that can be supplied to populate advertisement slots. Information about advertisements that can be retrieved by the advertisement server system 102 can include text information, target information, format information, and advertisement slot targeting information. The advertisement server system 102 stores the retrieved information in a data structure maintained in an advertisement data repository 320, such as a distributed hash table.

In some implementations, the advertisement selector 330 may select an advertisement for distribution to a particular advertisement slot based on content targeting or viewer profile targeting. For example, the content parser 116 may identify topics to associate with a registered domain based on contextual data associated with target domains of the registered domain. The content parser provides the identified topics to the advertisement selector 330, which match the identified topics to advertisement data 320 in order to select relevant advertisements. In some situations, such as where targeting is based on the viewer's profile, it may not be practical to identify the match between the advertisement and the advertisement slot in advance. Thus, historical information can be used to supplement direct advertisement slot targeting information.

The text information retrieved by the advertisement selector 330 includes information regarding a text component of the advertisement or a script of a speech component of the advertisement. For example, the text information can include all of the terms and phrases that appear in the advertisement. Additionally, the text information can include information regarding text of a title of the advertisement, closed captioning information for a video advertisement, and keywords that relate to the advertisement. The text information can be used to identify the relevant subject matter of the advertisement.

The target information includes information regarding a navigational destination of the advertisement. For example, the target information can include information regarding a landing page address of a link included in the advertisement, such as the home page of an advertiser, or a product information page for an advertised product. The target information can also include information regarding another navigational target associated with the advertisement, such as a target email address or phone number to which a viewer of the advertisement is directed.

The target information can be used to identify relevant subject matter of the advertisement. For example, if a landing page address is for an automotive company, it can be determined that the advertisement relates to cars, car parts, car service, or other car related subject matter.

The format information includes information regarding a format of the advertisement. For example, the format information can include information regarding whether the advertisement includes text-only, audio, or video. Additionally, the format information can include information regarding the file type of the advertisement creative.

The advertisement slot targeting information includes information regarding criteria by which an advertisement can be matched with an advertisement slot. For example, the advertisement slot targeting information can be used to match the advertisement with an advertisement slot using content targeting, in which an advertisement is paired with the advertisement slot based on contextual information associated with a target domain of the registered domain. Following the example given above in which the content parser 116 identified contextual information as relating to wine making and wine tasting, the advertisement selector can use advertisement data to identify advertisements for wine, stem ware, wine making products, or wine related tourism.

Figure 4:
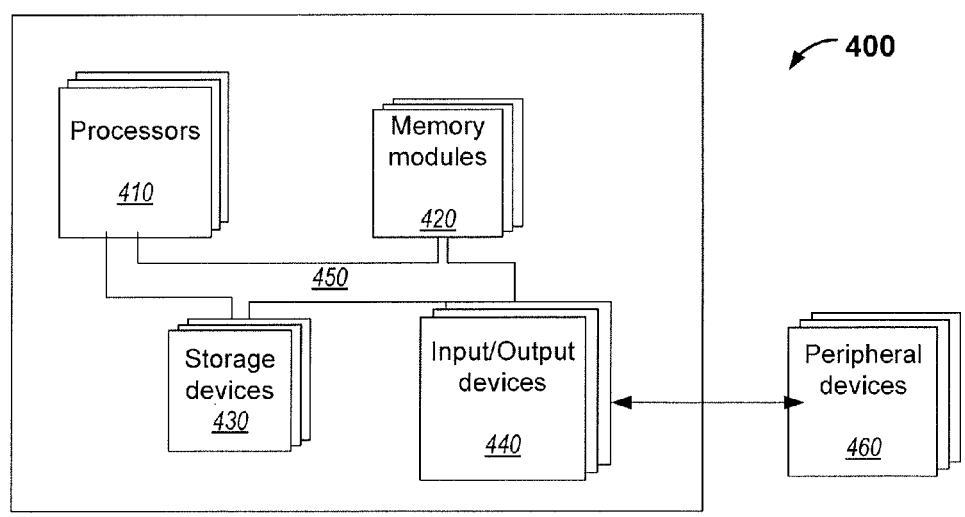
FIG. 4 is a block diagram of a computer system operable in the system of FIG. 1.

Referring to FIG. 4, one or more of the components of the system 100 and/or the advertisement server system 102, such as the advertisement selector 330, or the advertisement content parser 116, can include one or more computer systems, such as the computer system 400 of FIG. 4. The computer system 400 includes one or more processors 410, memory modules 420, storage devices 430, and input-output devices 440 connected by a system bus 450. The input-output devices 440 are operable with one or more peripheral devices 460, including a communication device that is operable to communicate with the network computer network 110 and with the other components of the systems 100 and/or 102. The one or more computer systems 400 can perform the various functions of the components of the systems 100 and 102 by executing computer-readable instructions embodied in computer software stored on a computer-readable storage device, such as the memory modules 420, the storage devices 430, and/or the peripheral devices 460.

Figure 5:
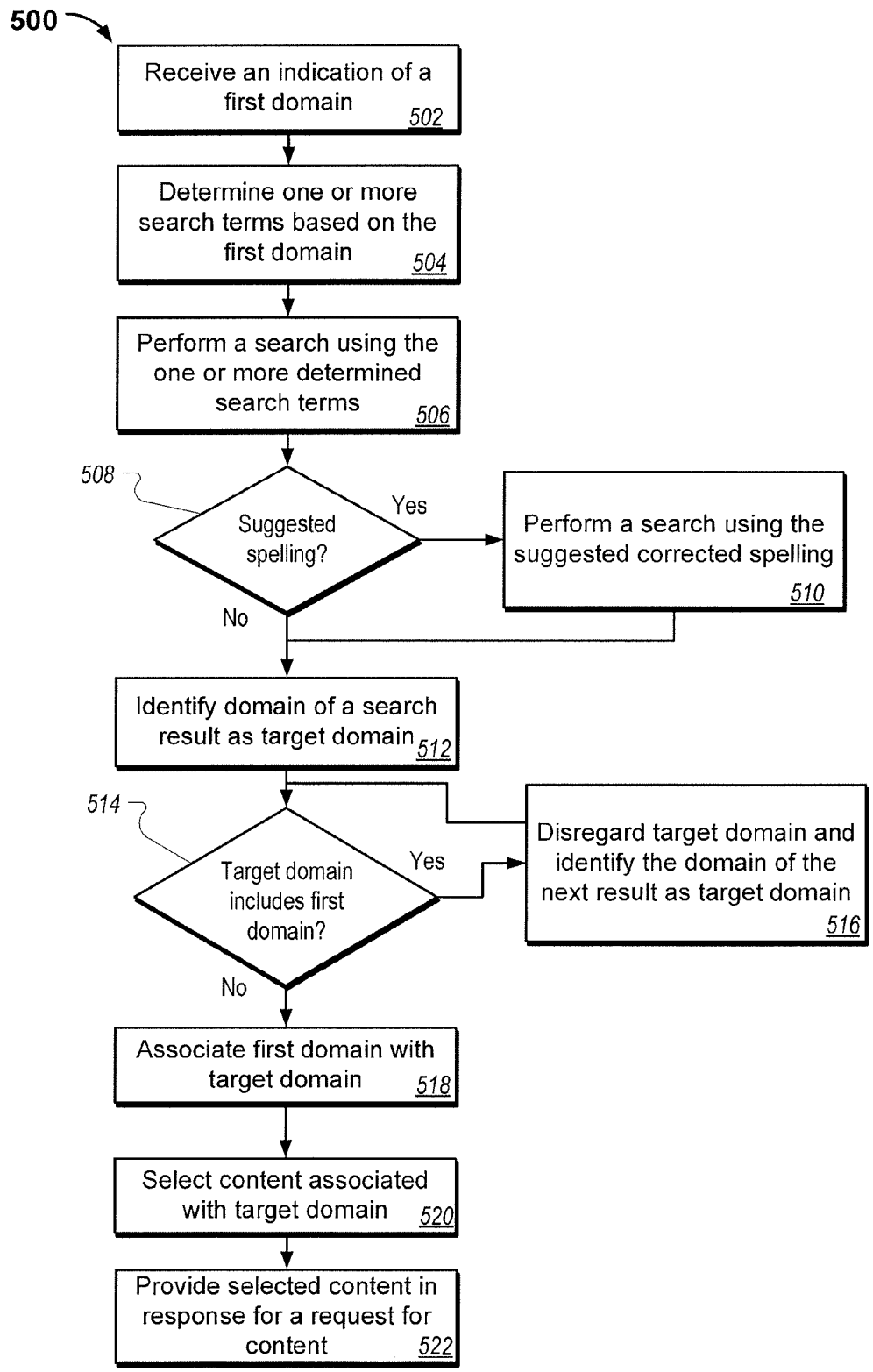
FIG. 5 is a flow diagram illustrating a process for managing content distribution.

Referring now to FIG. 5, a process 500 for managing content distribution includes receiving an indication of a first domain (502). For example, referring to FIG. 1, the domain owner 104 may register a new domain name. The advertisement server system 102 receives an indication of the new registered domain from the domain owner 104 so that the advertisement server system 102 can provide advertising content for the registered domain. For example, the domain owner 104 may register the domain "xampledomain.com" and inform the advertisement server system 102 of the domain name.

Next, one or more search terms are determined based on the first domain (504). Following the example above where the first domain is "xampledomain.com," the entire domain name of "xampledomain.com" can be used as a search term. As another example, a search term of "xample" is derived from the first domain. In some implementations, a top level domain (TLD) is stripped from the first domain to create a search term. For example, ".com" is removed from "xampledomain.com" to identify "xampledomain" as a search term.

A search is performed using the one or more determined search terms (506). For example, referring to FIG. 1, the advertisement server system 102 may provide the one or more search terms to the search engine 108 via the computer network 110. The search engine 108 performs a search using the search terms and provides the search results 112 to the advertisement server system 102. In some implementations, the search engine 108 performs a web search. In other implementations, the search engine 108 performs the search using a store of cached web data. As another example, the search engine 108 may be co-located with the advertisement server system 102. In this example, the advertisement server system 102 can communicate directly with the search engine 108 in order to provide the search terms to the search engine 108.

Next, a determination is made as to whether search results returned in response to operation 506 include a suggested corrected spelling (508). For example, referring to FIG. 2, the search results 204 may include the suggested corrected spelling 208 in response to a search performed for the search term 206 of "xampledomain." If it is determined that the search results include a suggested corrected spelling, a search using the suggested corrected spelling is performed (510).

If the search results do not include a suggested corrected spelling, or upon the completion of the search using the corrected spelling, a domain of the search result is identified as a target domain (512). For example, referring to FIG. 2, the domain 212 of the search result 210 may be identified as a target domain. As another example, the domain 220 of the search result 218 may be identified as a target domain. In certain implementations, a domain associated with the top search result is identified as the target domain or a domain of a search result that is associated with the greatest amount of contextual information is identified as the target domain.

Next, a determination is made as to whether the identified target domain includes the first domain (514). For example, referring to FIG. 2, if the domain 212 is identified as the target domain, it can be determined that the domain 212 of "www.whois.com/query?domain=xampledomain.com" includes the first domain of "xampledomain.com." If it is determined that the identified target domain includes the first domain, the target domain is disregarded and the domain of the next search result is identified as the target domain (516). Following the example above, the domain 212 may be disregarded, and the domain 216 may be identified as the target domain. This can help to eliminate domains that are associated with contextual information about the ownership and registration of the first domain (e.g., whois pages) from being used in selecting relevant advertising content.

Once a target domain that does not include the first domain is identified (514), the first domain is associated with the identified target domain (518). For example, a relationship between the first domain and the target domain is stored in a file, database, or lookup table.

Content associated with the target domain is selected (520). For example, advertising content that is relevant to subject matter associated with the target domain is selected as being relevant to the first domain. As another example, if the target domain includes an article about poker, advertisements that relate to card games, gambling, or casinos can be identified as being relevant to the first domain. In some implementations, selecting content includes parsing contextual information associated with the target domain to identify relevant topics. Advertising content that relates to the identified relevant topics are then selected.

The selected content then is provided in response for a request for content (522). For example, referring to FIG. 1, the end user system 118 sends a request for content associated with the first domain. The request reaches the DNS server 120, which resolves the first domain to an IP address associated with the advertisement server system 102. The request is then directed through the computer network 110 to a web server associated with the domain owner 104 which sends a request for content to the advertisement server system 102. The request also may be routed directly to the advertisement server system 102. In response to the request for content associated with the first domain, the advertisement server system 102 provides a web page that includes the selected content (e.g., advertising content) to the end user system 118 via the computer network 110 to be displayed to a user of the end user system 118.

In some implementations, more or fewer steps can be performed. For example, identifying whether the target domain includes a first domain (514) and disregarding the target domain and identifying the domain of the next result as the target domain if the first target domain includes the first domain (516) can be omitted from the process. As another example, a step of disregarding a target domain and identifying a new target domain if the originally identified target domain is associated with contextual content that does not exceed a predetermined threshold can be added to the process 500. In some implementations, one or more steps can be performed in a different order.

A number of implementations have been described. Nevertheless, it will be understood that various modifications may be made without departing from the spirit and scope of this disclosure. Accordingly, other implementations are within the scope of the following claims.

The invention claimed is:

1. A method comprising:
receiving an indication of a first domain name that is not associated with content;
determining, by at least one processor, one or more search terms based on the first domain name, with at least one of the one or more search terms including at least a portion of the first domain name;
sending a request to perform a search using the one or more search terms;
receiving, in response to the request, a second domain name;
analyzing content associated with the second domain name;
identifying, based on the content associated with the second domain name, a subject matter for the second domain name;
selecting, based on the subject matter, advertisements for the first domain name; and
providing the advertisements selected as content for the first domain name.

2. The method of claim 1, wherein the search comprises a first search, and wherein the method further comprises:
determining that a spelling suggestion is returned as a result of the first search; and
requesting performance of a second search using the spelling suggestion as a search term.

3. The method of claim 1,
wherein the second domain name includes the first domain name.

4. The method of claim 1, further comprising:
determining that a quantity of contextual information associated with the second domain name meets or exceeds a predetermined threshold.

5. The method of claim 1, further comprising:
using a portion of the first domain name to identify a language associated with the first domain name;
wherein the search requested comprises a language specific search based on the language.

6. The method of claim 1, further comprising:
using a portion of the first domain name to identify a country associated with the first domain name;
wherein the search requested comprises a country specific search based on the country.

7. The method of claim 1, wherein the search is for archived search data.

8. The method of claim 1, wherein selecting comprises:
selecting based on relevance of the advertisements to the subject matter.

9. The method of claim 1, wherein the first domain name comprises a URL.

10. A method comprising:
identifying a first URL;
requesting, by at least one processor, a keyword search using at least a portion of the first URL as a keyword;
receiving, in response to requesting, a second URL associated with a search result of the keyword search;
parsing, by the at least one processor, content associated with the second URL;
identifying, based on parsing, subject matter associated with the content;
selecting one or more content items at least partially based on relevance to the subject matter;
receiving a request for content associated with the first URL; and
providing, in response to the request, the one or more content items as the content for the first URL.

11. The method of claim 10, wherein the one or more content items include one or more advertising content items.

12. The of claim 10, wherein the keyword search comprises a first keyword search, and wherein the method further comprises:
determining that a spelling suggestion is returned as a result of the first keyword search; and
performing a second keyword search using the spelling suggestion as a search term.

13. The method of claim 10, wherein the second URL differs from the first URL.

14. The method of claim 10, wherein a quantity of content associated with the second URL meets or exceeds a predetermined threshold.

15. The method of claim 10, further comprising:
using a portion of the first URL to identify a language associated with the first URL;
wherein the keyword search requested comprises a language specific search based on the language.

16. The method of claim 10, further comprising:
using a portion of the first URL to identify a country associated with the first URL;
wherein the keyword search requested comprises a country specific search based on the country.

17. The method of claim 10, wherein the keyword search is for archived search data.

18. The method of claim 10, wherein providing the one or more content items comprises providing a web page with the one or more content items.

19. One or more non-transitory machine-readable media configured to store instructions that are executable by one or more processors to perform operations comprising:
receiving an indication of a first domain name that is not associated with content;
determining one or more search terms based on the first domain name, with at least one of the one or more search terms including at least a portion of the first domain name;
sending a request to perform a search using the one or more search terms;
receiving, in response to the request, a second domain name;
analyzing content associated with the second domain name;
identifying, based on the content associated with the second domain name, a subject matter for the second domain name;
selecting, based on the subject matter, advertisements for the first domain name; and
providing the advertisements selected as content for the first domain name.

20. The one or more non-transitory machine-readable media of claim 19, wherein the operations further comprise:
using a portion of the first domain name to identify a language associated with the first domain name;
wherein the search requested comprises a language specific search based on the language.

21. The one or more non-transitory machine-readable media of claim 19, wherein selecting comprises:
selecting based on relevance of the advertisements to the subject matter.

22. An electronic system comprising:
one or more processors; and
one or more machine-readable media configured to store instructions that are executable by the one or more processors to perform operations comprising:

receiving an indication of a first domain name that is not associated with content;

determining one or more search terms based on the first domain name, with at least one of the one or more search terms including at least a portion of the first domain name;

sending a request to perform a search using the one or more search terms;

receiving, in response to the request, a second domain name;

analyzing content associated with the second domain name;

identifying, based on the content associated with the second domain name, a subject matter for the second domain name;

selecting, based on the subject matter, advertisements for the first domain name; and providing the advertisements selected as content for the first domain name.

* * * * *

UNITED STATES PATENT AND TRADEMARK OFFICE
CERTIFICATE OF CORRECTION

| | | |
|---|---|---|
| PATENT NO. | : 8,527,493 B1 | Page 1 of 1 |
| APPLICATION NO. | : 12/724662 | |
| DATED | : September 3, 2013 | |
| INVENTOR(S) | : Nicolas Hamatake | |

It is certified that error appears in the above-identified patent and that said Letters Patent is hereby corrected as shown below:

In the Claims:

Claim 12, Column 14, at line 3: delete "The of" and insert -- The method of --, therefor.

Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,527,493 B1 | Page 1 of 1 |
| APPLICATION NO. | : 12/724662 | |
| DATED | : September 3, 2013 | |
| INVENTOR(S) | : Hamatake | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 331 days.

Signed and Sealed this
Twenty-fourth Day of March, 2015

Michelle K. Lee
*Director of the United States Patent and Trademark Office*